May 14, 1957 R. W. SADDORIS 2,791,928
ADJUSTABLE STEADY REST FOR TURRET LATHES
AND AUTOMATIC SCREW MACHINES
Filed July 6, 1953
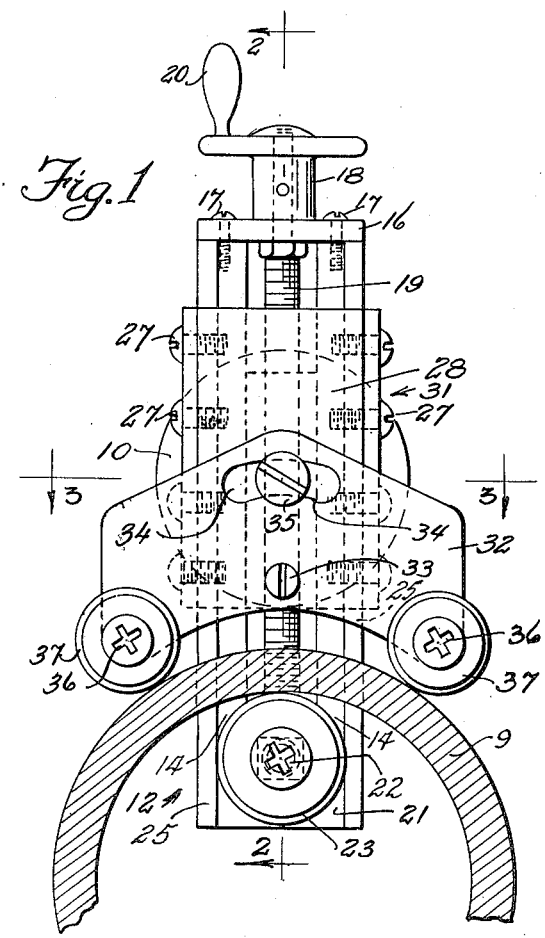
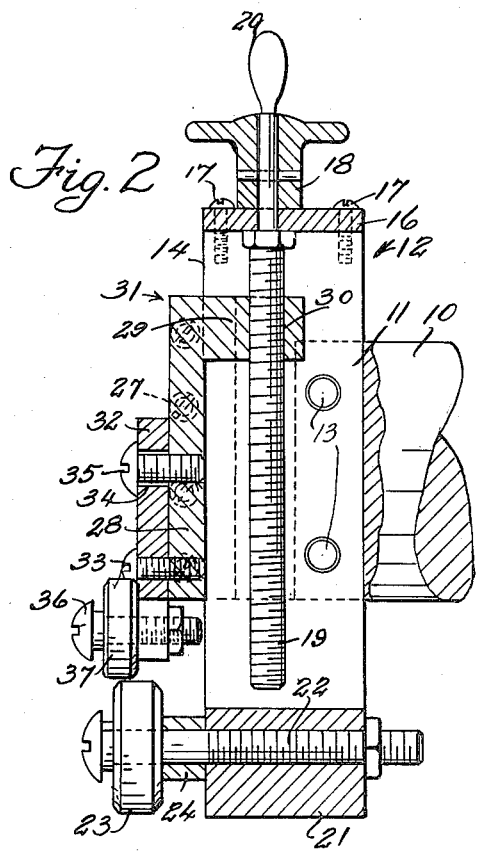
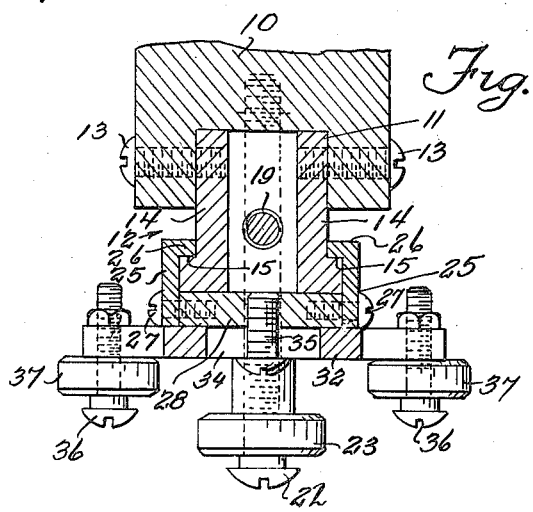
INVENTOR.
Rex W. Saddoris,
BY Victor J. Evans & Co.
ATTORNEYS

United States Patent Office 2,791,928
Patented May 14, 1957

2,791,928
ADJUSTABLE STEADY REST FOR TURRET LATHES AND AUTOMATIC SCREW MACHINES

Rex W. Saddoris, Toledo, Ohio

Application July 6, 1953, Serial No. 366,150

1 Claim. (Cl. 82—38)

This invention relates to a steady rest, and more particularly to an adjustable steady rest for turret lathes, automatic screw machines and the like.

The object of the invention is to provide a steady rest which will firmly hold the work and oppose the cutting force applied by the cutting tool.

Another object of the invention is to provide a steady rest for supporting the end of the work piece such as a bronze bushing or tube, the steady rest adapted to be used on various machines such as compounds or turret lathes or vertical mills whereby the operator will be able to accomplish various operations in less time, with less effort and with greater accuracy.

A further object of the invention is to provide an adjustable steady rest which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the adjustable steady rest, constructed according to the present invention.

Figure 2 is a sectional view taken on the line 2—2 of Figure 1.

Figure 3 is a sectional view taken on the line 3—3 of Figure 1.

Referring in detail to the drawings, the numeral 10 designates a boring bar which may extend from a turret lathe, and the boring bar 10 has a slot or opening 11 in its end, Figure 3. Seated in the slot 11 and secured to the boring bar 10 by set screws 13 is a stationary post 12. The post 12 includes a pair of spaced apart legs 14 which are each provided with a shoulder 15 on their outer surface for a purpose to be later described.

Extending across the upper end of the legs 14 is a horizontally disposed plate 16. The plate 16 is secured to the legs 14 by suitable screws 17, and rotatably supported on the plate 16 is a handle member 18 which is adapted to be used for rotating a threaded screw member 19. A hand grip 20 extends upwardly from the handle member 18.

The adjustable steady rest is further constructed so that the post 14 includes a bearing portion 21 into which extends a bolt and nut assembly 22, and supported on the bolt and nut assembly 22 is a roller 23. There is circumposed on the bolt 22 a sleeve 24, the sleeve 24 being interposed between the roller 23 and the bearing portion 21, Figure 2.

Slidably engaging each of the legs 14 of the post 12 is an L-shaped arm 25. Each of the arms 25 is provided with a transverse flange 26 for slidably engaging the shoulders 15, Figure 3, and extending between the pair of arms 25 is a bracket 28. The bracket 28 is secured to the pair of arms 25 by suitable bolts or screws 27. The bracket 28 includes an inwardly extending finger 29 which is provided with a threaded opening or aperture 30 for threadedly receiving therein the screw member 19. Thus, as the handle member 18 is rotated by means of the hand grip 20 the screw member 19 will be rotated to thereby cause the head 31 to move up and down with respect to the post 12. The head 31 includes the arms 25 and bracket 28.

Carried by the head 31 is an adjustable body member or plate 32, and the body member 32 is pivotally connected to the bracket 28 by a screw or pin 33. The body member 32 is further provided with an arcuate slot 34, and a pin or screw 35 extends through the slot 34 and into engagement with the bracket 28. Thus, by loosening the screw 35, the body member 32 can be pivoted about the pin 33 so as to permit the rollers to accommodate different sizes or shapes of articles that are being worked on. A pair of bolt and nut assemblies 36 are connected to the body member 32, and a small roller 37 is rotatably mounted on each of the bolt and nut assemblies 36.

From the foregoing it is apparent that an adjustable steady rest has been provided which can be used on turret lathes and the like. As is well known in turret lathes, the work rotates and the tool and the boring bar are stationary. The boring bar 10 is provided with an opening or slot 11 into which seats the post 12, the post 12 being secured to the boring bar 10 by the screws 13. The work piece 9 that is being acted upon by the tool has its end received between the rollers 37 and the roller 23 and by adjusting the screw member 19 by means of the handle 18, the work piece 9 can be firmly clamped between these rollers. The body member 32 can be moved or pivoted about the pin 33 to accommodate various types of work. The present invention will support the end of work pieces such as bronze bushings, tubes of different sizes as well as pipes and the steady rest can be used on compound or turret lathes or vertical mills and will save much time during the performing of various operations and will also provide a more accurate job. In actual use the rollers 37 and 23 contact the work or casting in the chuck after the body member 32 has been adjusted so that the work will be held steady in order to permit the turret lathe with the boring bar to operate. The steady rest will support any work piece which extends out from the chuck of a turret lathe, boring mill or automatic screw machine. The steady rest can also be bolted or otherwise secured to the tool post in order to hold the casting so that it can be threaded or provided with a radius chamfer or it can be used for supporting any work which needs support.

With the parts arranged as shown in Figure 1, one end of the work 9 is supported by the usual chuck, while the opposite end of the work is supported by the steady rest of the present invention. In Figure 1, the rollers 37 contact the outer surface of the work 9 while the roller 23 contacts the inner surface of the work 9.

The present invention provides a rigid support that is used to hold one end of the work while the tool is cutting so as to keep this end from moving out of line with the other end and this also serves to keep the tool from chattering whereby smooth and straight cuts can be made. The device is used in a boring bar to support the end of the bushing, tubing, or bar, and is used while the turning tool in the square turret or tool post on the compound or cross carriage is working, turning or cutting any part of a casting or the like.

I claim:

In an adjustable steady rest for attachment to a bar having an opening in an end thereof, a stationary post secured in said opening and including a pair of spaced parallel legs and a lower bearing portion extending between said pair of legs, a plate extending across the top of said legs and secured thereto, a screw member extending between said legs, a manually operable handle for rotating said screw member, said legs each being provided with an outer shoulder, a pair of arms slidably engaging the shoulders of said legs, a bracket extending between said pair of arms and secured thereto, a finger extending inwardly from the upper end of said bracket and provided with a threaded opening for receiving said screw member, a roller rotatably supported by said bearing portion, a body member pivotally connected to said bracket and provided with an arcuate slot intermediate its ends, a securing element extending through said slot and into engagement with said bracket, and a pair of rollers rotatably supported by said body member.

References Cited in the file of this patent

UNITED STATES PATENTS

| | | |
|---|---|---|
| 689,951 | Clare | Dec. 31, 1901 |
| 898,589 | Meyers | Sept. 15, 1908 |
| 1,906,100 | Richardson | Apr. 25, 1933 |
| 2,380,039 | Gideon | July 10, 1945 |
| 2,473,418 | Fellroth | June 14, 1949 |
| 2,609,592 | Shumaker | Sept. 9, 1952 |